(12) United States Patent
Wani et al.

(10) Patent No.: US 7,390,590 B2
(45) Date of Patent: Jun. 24, 2008

(54) BATTERY STORAGE CASE

(75) Inventors: Yoshiaki Wani, Saitama (JP); Kenichi Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 74 days.

(21) Appl. No.: 10/075,183

(22) Filed: Feb. 14, 2002

(65) Prior Publication Data

US 2002/0127468 A1 Sep. 12, 2002

(30) Foreign Application Priority Data

Feb. 20, 2001 (JP) ............................ P2001-044194

(51) Int. Cl.
*H01M 2/10* (2006.01)
(52) U.S. Cl. .......................... 429/96; 429/100; 429/159; 206/703; 206/705
(58) Field of Classification Search .................. 429/96, 429/99, 100, 163, 159; 206/703, 705; 220/602, 220/617, 615, 622, 623, 669, 682, 8, 4.03, 220/612; D09/435, 444, 569, 570, 566; 362/116, 362/9; D03/209; D13/103; 224/902
See application file for complete search history.

(56) References Cited

U.S. PATENT DOCUMENTS

| | | | | |
|---|---|---|---|---|
| 1,189,052 A | * | 6/1916 | Brookshire | ................ 285/303 |
| 1,450,674 A | * | 4/1923 | Marston | ......................... 220/8 |
| 3,306,266 A | * | 2/1967 | McCunney | ................ 206/38.1 |
| 3,881,601 A | * | 5/1975 | Walus et al. | ................ 206/497 |
| 4,046,279 A | | 9/1977 | Rosler | |
| 4,087,015 A | * | 5/1978 | Murdoch | ..................... 215/201 |
| 4,210,253 A | | 7/1980 | Rosler | |
| 4,298,036 A | * | 11/1981 | Horvath | ......................... 141/1 |
| 4,509,656 A | | 4/1985 | Rosler | |
| 4,596,340 A | | 6/1986 | Luther | |
| 5,117,976 A | * | 6/1992 | Whitt et al. | ................. 206/705 |
| D341,227 S | * | 11/1993 | Lang et al. | .................... D28/76 |
| 5,318,177 A | * | 6/1994 | Isacson | ....................... 206/38.1 |
| 5,605,242 A | * | 2/1997 | Hwang | .......................... 220/8 |
| 5,680,949 A | | 10/1997 | Roesler | |
| 5,819,917 A | * | 10/1998 | Nicholson | ..................... 206/38 |
| 5,829,591 A | * | 11/1998 | Lyons | ......................... 206/373 |
| D409,560 S | * | 5/1999 | Shim | .......................... D13/103 |
| D409,830 S | * | 5/1999 | Stafford | ....................... D3/208 |
| D433,562 S | * | 11/2000 | Redlinger | .................... D3/208 |

FOREIGN PATENT DOCUMENTS

| | | |
|---|---|---|
| JP | 11-321865 | 11/1999 |
| JP | 11-321868 | 11/1999 |
| WO | WO 9424008 A1 * | 10/1994 |

* cited by examiner

*Primary Examiner*—Gregg Cantelmo
(74) *Attorney, Agent, or Firm*—Sonnenschein Nath & Rosenthal LLP

(57) ABSTRACT

A battery storage case including a main body and a lid portion. In one embodiment, the case includes first and second projection trains formed on the main body and a third projection train formed on the lid portion, wherein the third projection train is adapted to engage one of the first projection train and the second projection train. In one embodiment, a through-hole is formed through a head portion of the lid portion.

25 Claims, 4 Drawing Sheets

BATTERY STORAGE CASE

BACKGROUND OF THE INVENTION

1. Field of the Invention

The present invention relates to a transparent plastic battery storage case suitable for storing therein a battery or batteries and displaying the stored battery or batteries at a store for sale, furthermore suitable for a user, who has bought the stored battery or batteries, to carry the batteries stored in this battery storage case while the batteries stored in the battery storage case can be protected from being damaged.

2. Description of the Related Art

In recent years, portable electric products have been used widely When a battery-powered portable electric product is in use, it is customary that a user should purchase spare batteries in advance and carry the spare batteries together with the portable electric product.

In general, transparent plastic storage cases are used to store therein stationery, tools, kitchenware, electric products, foods, general merchandise, et cetera and to protect them from being damaged. Examples of such transparent plastic storage cases are disclosed in Japanese laid-open utility model No 61-99491, Japanese laid-open utility model No. 62-105134, Japanese patent No. 3015772, Japanese laid-open patent No. 11-321865, Japanese laid-open patent No. 11-321868, U.S. Pat. Nos. 4,509,656, 4,046,279, 4,210,253, 4,596,340, 5,680,949 and so forth, for example.

Transparent plastic storage cases are generally used to store therein articles and their main object is to display goods stored therein. Accordingly, it has not yet been considered that transparent plastic storage cases may be carried as they are when they are in use. Therefore, transparent plastic storage cases according to the related art have so far encountered with various problems that should be solved. That is, if a transparent plastic storage case has sharp corners and such sharp corners are damaged and broken when it is being kept in a bag and so forth, then such broken corners become obstacles for users to take out the stored goods from the transparent plastic storage case. It can also be expected that, even though the sharp corner of the transparent plastic storage case is not broken, such sharp corner will damage other goods while a user carries goods put in a bag and so forth together with the transparent plastic storage case. Moreover, after the articles have been taken out from the transparent plastic storage case, the transparent plastic storage case becomes empty, the empty storage case itself becomes useless and acts as a nuisance for disturbing a user carrying the articles.

From these reasons, suitable transparent plastic battery storage case by which spare batteries can be stored therein and by which users can carry spare batteries are not yet commercially available on the market.

SUMMARY OF THE INVENTION

In view of the aforesaid aspect, it is an object of the present invention to provide a battery storage case which can be used as a battery storage case to display batteries stored therein for sale.

Another object of the present invention is to provide a battery storage case which is suitable as a spare battery storage case for storing spare batteries therein when a user carries those spare batteries.

A further object of the present invention is to provide a battery storage case which is easy to carry when it becomes empty after batteries have been ejected therefrom.

According to an aspect of the present invention, there is provided a battery storage case including a main body having a body portion, an opening portion of one end of the body portion and a bottom surface of the other end of the body portion and a lid portion having a body portion, an opening portion of one end of the body portion and a head portion of the other end of the body portion. This battery storage case includes projection trains formed on an outer surface of the body portion of the main body, projections or projection trains formed on an inner surface of the body portion of the lid portion so as to be engaged with the projection trains of the main body and a through-hole bored through the head portion of the lid portion, wherein a circumference portion of at least one opening portion of the through-hole is shaped like a concave portion and a part of the circumference portion of the through-hole is cylindrical in shape.

According to the battery storage case of the present invention, there can be obtained advantages that the inventive battery storage case can function as a display case for displaying a battery at a store for sale and that a user can use this battery storage case as a spare battery storage case for storing therein spare batteries for a portable electric product.

Specifically, since the lid portion includes the through-hole the circumference portion of which is shaped like the concave portion, a hook can be inserted to support the battery storage case for display, et cetera into this through-hole more easily.

Further, since the projection trains of the body portion and the projections or the projection trains of the lid portion are engaged with each other so that the battery storage case can be made flexible, after the batteries have been ejected from the battery storage case, this battery storage case can be contracted, shortened and may become easier to carry.

Furthermore, since the battery storage case according to the present invention has no sharp projections on its surface and is shaped like the smooth curved surface on the whole, it is convenient for users to carry this battery storage case as a spare battery storage case. Moreover, there is then no risk that the battery storage case according to the present invention will damage other goods while it is being kept in a bag and et cetera together with other goods.

DESCRIPTION OF THE PREFERRED EMBODIMENTS

A battery storage case according to the embodiments of the present invention will be described below with reference to the accompanying drawings.

First, a battery storage case according to an embodiment of the present invention will be described with reference to FIG. 1.

Figure 1:
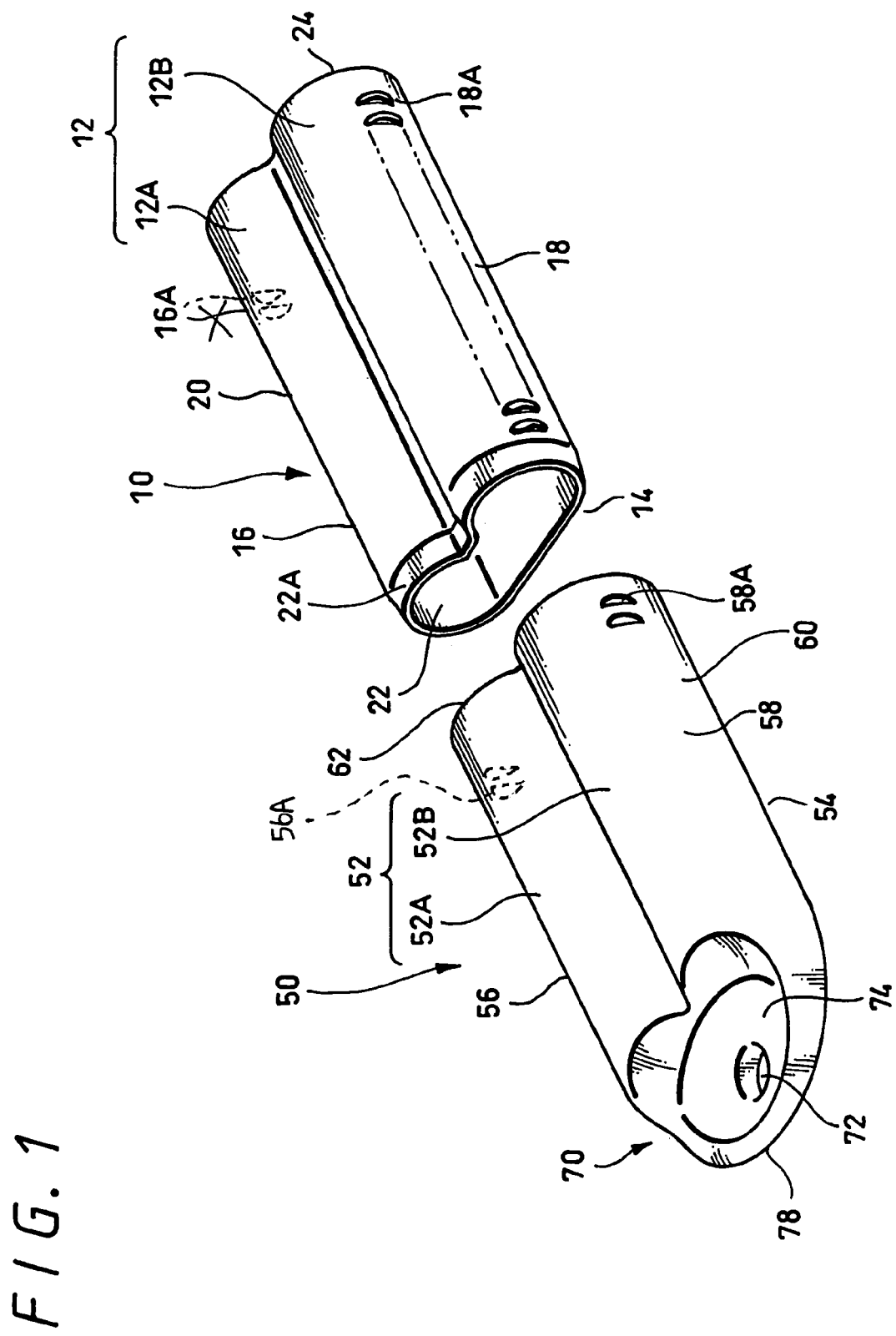
FIG. 1 is a perspective view useful for explaining a battery storage case according to an embodiment of the present invention.

As shown in FIG. 1, a battery storage case according to this embodiment includes a transparent plastic main body 10 and a lid portion 50. The main body 10 is shaped as a container including a cylindrical body 20 the cross-section of which is shaped as a pair of glasses, an opening portion 22 of an upper end and a bottom surface 24 of a lower end. The opening portion 22 and the bottom surface 24 are shaped as a pair of glasses in cross-section similarly to the cross-section of the cylindrical body 20. The body 20 includes a flat front surface 14, a rear surface 12 including a pair of semicylindrical portions 12A, 12B and two side surfaces 16, 18.

The lid portion 50 is shaped as a lid including a cylindrical body 60 the cross-section of which is shaped as a pair of glasses, a head portion 70 of an upper end and an opening portion 62 of a lower end, The opening portion 62 is shaped as a pair of glasses in cross-section similarly to the cross-section of the body 60. The body 60 includes a flat front surface 54, a rear surface 52 including a pair of semicylindrical portions 52A, 52B and two side surfaces 56, 58.

The body 20 of the main body 10 and the body 60 of the lid portion 50 are both shaped as a pair of glasses in cross-section so as to store therein batteries of two rows. The pair of semicylindrical portions 12A, 12B of the rear surface 12 of the main body 10 and the pair of semicylindrical portions 52A, 52B of the rear surface 52 of the lid portion 50 are designed so as to become parallel with outward forms of batteries stored therein.

Projection trains 16A, 18A are provided on the outer surfaces of the side surfaces 16, 18 of the body 20 of the main body 10 over substantially the whole length along the axial direction (only the projection train 18A is illustrated in FIG. 1). Each of the projections is extended on the outer surfaces of the side surfaces 16, 18 along the circumference direction or the lateral direction and these projections are disposed at regular intervals. Projection trains 56A, 58A are provided on the inner surfaces of the side surfaces 56, 58 of the body 60 of the lid portion 50 near the opening portion along the axial direction (only the projection train 58A is illustrated in FIG. 1). Each of the projections is extended on the inner surfaces of the side surfaces 56, 58 along the circumference direction or the lateral direction and these projections are disposed at regular intervals.

Outer diameters of the tip ends of the projections 16A, 18A of the side surfaces 16, 18 of the body 20 of the main body 10 are smaller than the inner diameters of the side surfaces 56, 58 of the body 60 of the lid portion 50 and are larger than the inner diameters of the tip ends of the projections 56A, 58A. Accordingly, when the main body 10 is covered with the lid portion 50 or when the main body 10 is inserted into the lid portion 50, the projections 16A, 18A of the side surfaces 16, 18 of the main body 10 are butted against the projections 56A, 58A of the side surfaces 56, 58 of the lid portion 50. When the main body 10 is further pushed into the lid portion 50, the side surfaces 16, 18 of the main body 10 are inwardly deformed with an elasticity and the side surfaces 56, 58 of the lid portion 50 are outwardly deformed with an elasticity, whereby the projections 16A, 18A of the side surfaces 16, 18 of the main body 10 are proceeded over the projections 56A, 58A of the side surfaces 56, 58 of the lid portion 50.

When the lid portion 50 is released from the main body 10 or when the main body 10 is ejected from the lid portion 50, operations similar to the above-mentioned operations are executed Although the projections 16A, 18A of the side surfaces 16, 18 of the main body 10 are butted against the projections 56A, 58A of the side surfaces 56, 58 of the lid portion 50, when the main body 10 is further extracted from the lid portion 50, the side surfaces 16, 18 of the main body 10 are inwardly deformed with an elasticity and the side surfaces 56, 58 of the lid portion 50 are outwardly deformed with an elasticity, whereby the projections 16A, 18A of the side surfaces 16, 18 of the main body 10 are proceeded over the projections 56A, 58A of the side surfaces 56, 58 of the lid portion 50.

Since the projections 16A, 18A of the side surfaces 16, 18 of the main body 10 and the projections 56A, 58A of the side surfaces 56, 58 of the lid portion 50 are brought in contact with each other, both of them can be prevented from being released from each other unless a user applies force to the lid portion 50 and the main body 10. Specifically, the projections 16A, 18A of the side surfaces 16, 18 of the main body 10 and the projections 56A, 58A of the side surfaces 56, 58 of the lid portion 50 are engaged with each other and thereby both of the lid portion 50 and the main body 10 can be prevented from being released from each other naturally.

In order to insert the main body 10 into the lid portion 50 more easily, a nearby portion 22A of the opening portion 22 of the main body 10 is slightly smaller than the cross-section of the body 20.

A head portion 70 has a through-hole 72 extended from the rear surface 52 side of the body 60 to the front surface 54 side. The head portion 70 has an outward form which is a smooth curved surface on the whole. The shape and the size of the cross-section of the head portion 70 are continuously changed from the upper end of the body 60 to the upper end of the head portion 70. Specifically, the head portion 70 has no sharp projections thereon.

Figure 2:
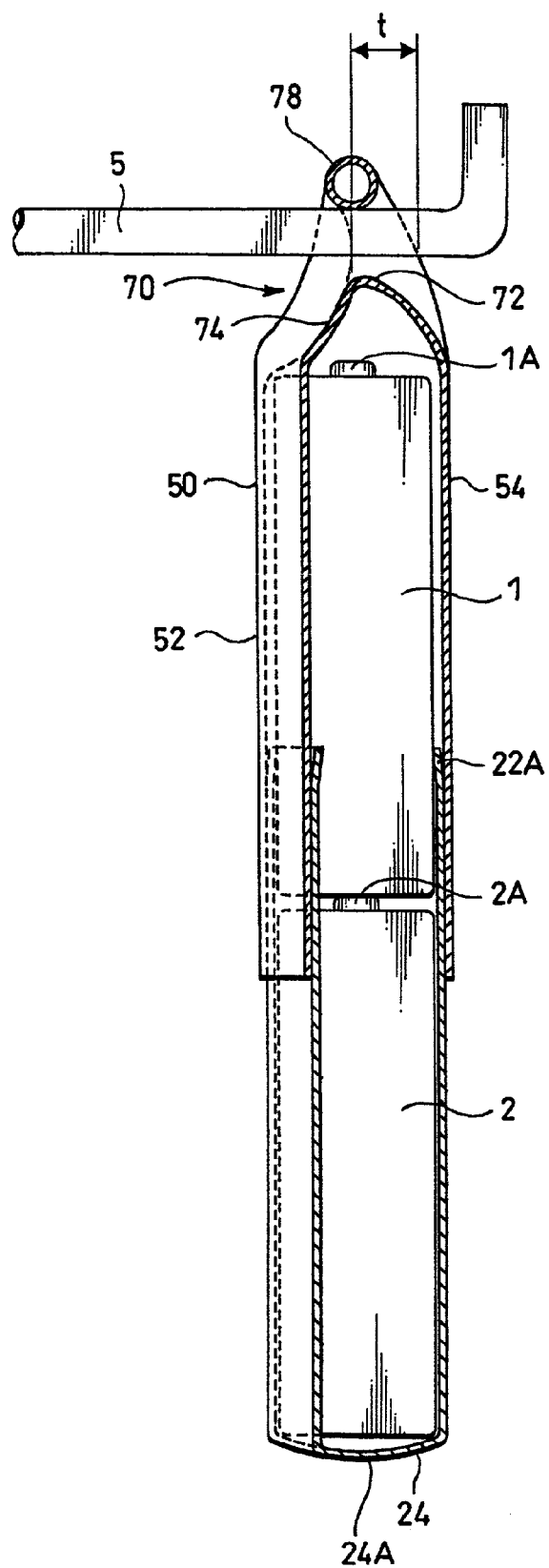
FIG. 2 is a cross-sectional side view useful for explaining the above-mentioned battery storage case according to the embodiment of the present invention when this battery storage case is in use.

The manner in which the transparent plastic battery storage case according to the present invention is used will be described with reference to FIG. 2. FIG. 2 shows the state in which a battery storage case containing four batteries 1, 2, 3, 4 (only the batteries 1 and 2 of the four batteries 1, 2, 3 and 4 are illustrated) is supported by a hook 5 for display at a store. The hook 5 is inserted into the through-hole 72 of the head portion 70 of the lid portion 50 of the battery storage case. As described above, the battery storage case according to this embodiment is able to store therein batteries of two rows. Each row can store therein two batteries in the state in which they are stacked on each other.

While the batteries 1 and 2 are disposed in such a manner that their positive electrode plate sides including projections 1A, 2A are directed in the upward direction, the present invention is not limited thereto and the batteries 1 and 2 are disposed in such a manner that their positive electrode plate sides are directed in the downward direction. When the batteries 1 and 2 are disposed in such a manner that the projections 1A, 2A of the positive electrode plate sides are directed in the upward direction as shown in FIG. 2, the projection 1A of the positive electrode plate side of the upper battery 1 is located in a space within the head portion 70 of the upper end of the lid portion 50. The bottom surface 24 of the main body 10 is slightly curved as shown in FIG. 2 and has a convex portion 24A which has sufficient space to accommodate therein the projection of the positive electrode plate side of the battery. When the batteries are disposed in such a manner that the projections of the positive electrode plate sides of the batteries are directed in the downward direction, the projection of the positive electrode plate side of the battery on the lower side is accommodated in the convex portion 24A of the bottom surface 24 of the main body 10.

Figure 3:
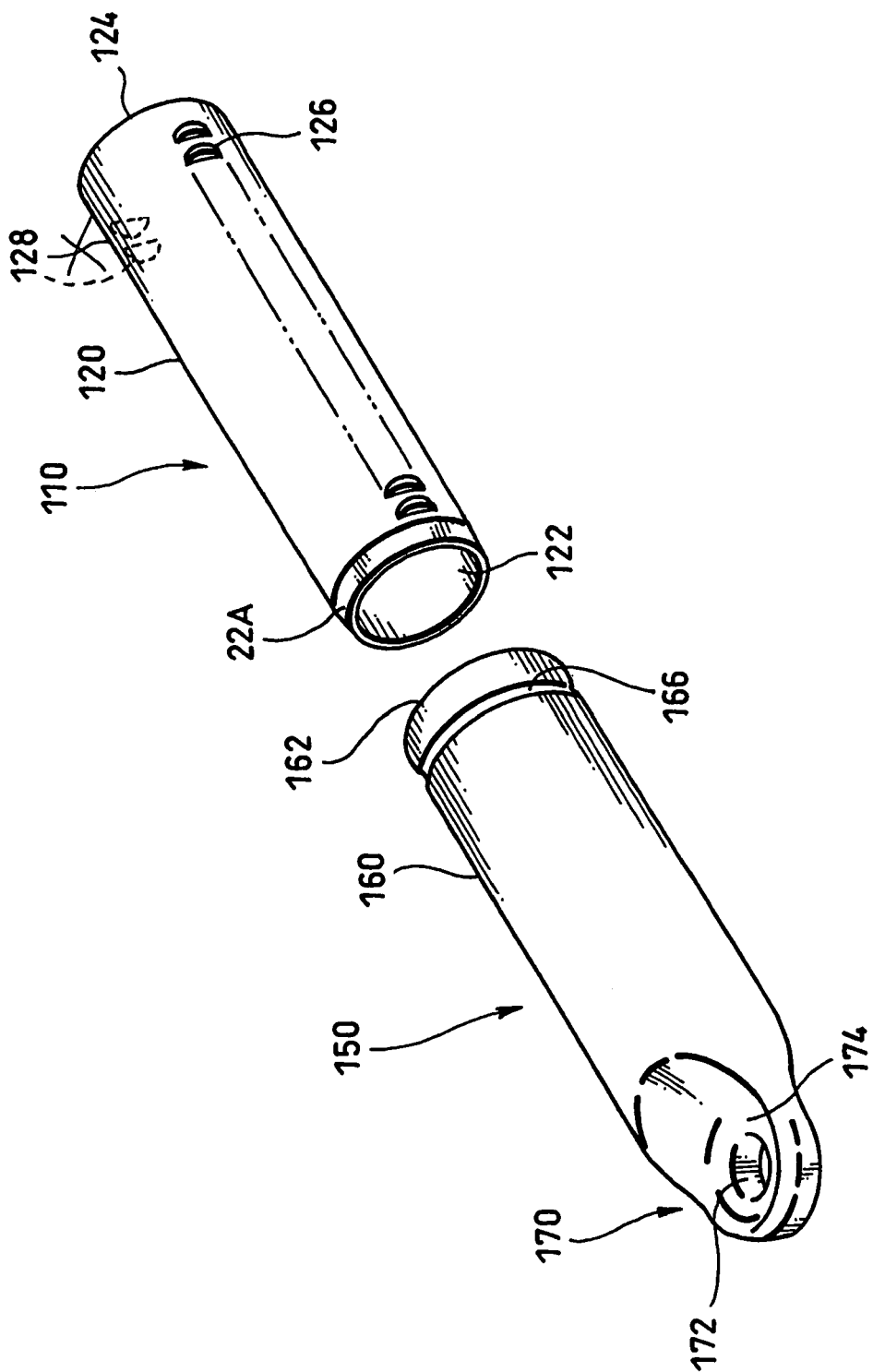
FIG. 3 is a perspective view useful for explaining a battery storage case according to another embodiment of the present invention.

After the two batteries have been ejected from the battery storage case in which four batteries are to be stored as shown in FIG. 1 or after one battery has been ejected from the battery storage case in which two batteries are stored as shown in FIG. 3, the battery storage case can be further contracted and thereby can be reduced in size when the user carries the battery storage case.

The through-hole 72 includes the opening portion on the rear surface 52 side and the opening portion on the front surface 54 side and one of such two opening portions, e.g., in the illustrated example, a circumference portion 74 of the opening portion on the rear surface 52 side is made hollow. Accordingly, a thickness t of the head portion 70 can substantially be decreased around the through-hole 72 so that the user can insert the hook 5 into the through-hole 72 more easily.

As shown in FIG. 2, an upper end 78 of the through-hole 72 is shaped like a hollow cylinder and an outward form of the upper end 78 forms a part of the cylindrical member. Accordingly, in this embodiment, the head portion 70 of the lid portion 50 has a smooth outward form having no sharp protrusions formed thereon.

Next, a battery storage case according to another embodiment of the present invention will be described with reference to FIG. 3.

As shown in FIG. 3, a battery storage case according to this embodiment includes a transparent plastic main body 110 and a lid portion 150. The main body 110 is shaped like a container including a cylindrical body 120 the cross-section of which is circular in shape, an opening portion 122 of an upper end and a bottom surface 124 of a lower end. The opening portion 122 and the bottom surface 124 are circular in shape similarly to the cross-section of the body 120.

The lid portion 150 is shaped as a lid including a cylindrical body 160 the cross-section of which is circular in shape, a head portion 170 of an upper end and an opening portion 162 of a lower end. The opening portion 162 is circular in shape similarly to the cross-section of the body 160.

The body 120 of the main body 110 and the body 160 of the lid portion 150 are both circular in cross-section and are able to store therein batteries of one line. The body 120 of the main body 110 and the body 160 of the lid portion 150 are designed so as to become parallel with the outward form of the batteries.

Projection trains 126, 128 (only one projection train 126 is illustrated in FIG. 3) are provided on both sides of the outer surface of the body 120 of the main body 110 over substantially the whole length along the axial direction. Each of the projections is extended on the outer surface of the body along the circumference direction or the lateral direction, and these projections are disposed at regular intervals. On the inner surface of the body 160 of the lid portion 150 an annular projection 166 is formed at the portion near the opening portion. Although only the annular projection 166 of one row is illustrated in FIG. 3, the present invention is not limited thereto and a plurality of annular projection rows can be formed around the body 160 of the lid portion 150. In this case, each of projections may be located at regular intervals.

Operations and functions of the projection trains 126, 128 of the body 120 of the main body 110 and the annular projection 166 of the body 160 of the lid portion 150 are similar to those of the projections 16A, 18A of the side surfaces 16, 18 of the main body 10 and the projections 56A, 58A of the side surfaces 56, 58 of the lid portion 50 in the preceding embodiment shown in FIG. 1 and therefore need not be described.

As shown in FIG. 3, the head portion 170 has an outward form which is a smooth curved surface on the whole, and the shape and the size of the cross-section of the head portion 170 are continuously changed from the body to the upper end. Specifically, the head portion 170 is formed so as not to have sharp projections. The head portion 170 has a through-hole 172 extended therein along the direction perpendicular to the axis of the body 160. A circumference portion 174 of at least one of the two opening portions of the through-hole 172 is made hollow. Accordingly, as noted earlier with reference to FIG. 2, the thickness t of the head portion 170 can substantially be decreased around the through-hole 172 so that the user can insert the hook 5 into the through-hole 172 more easily.

Figure 4:
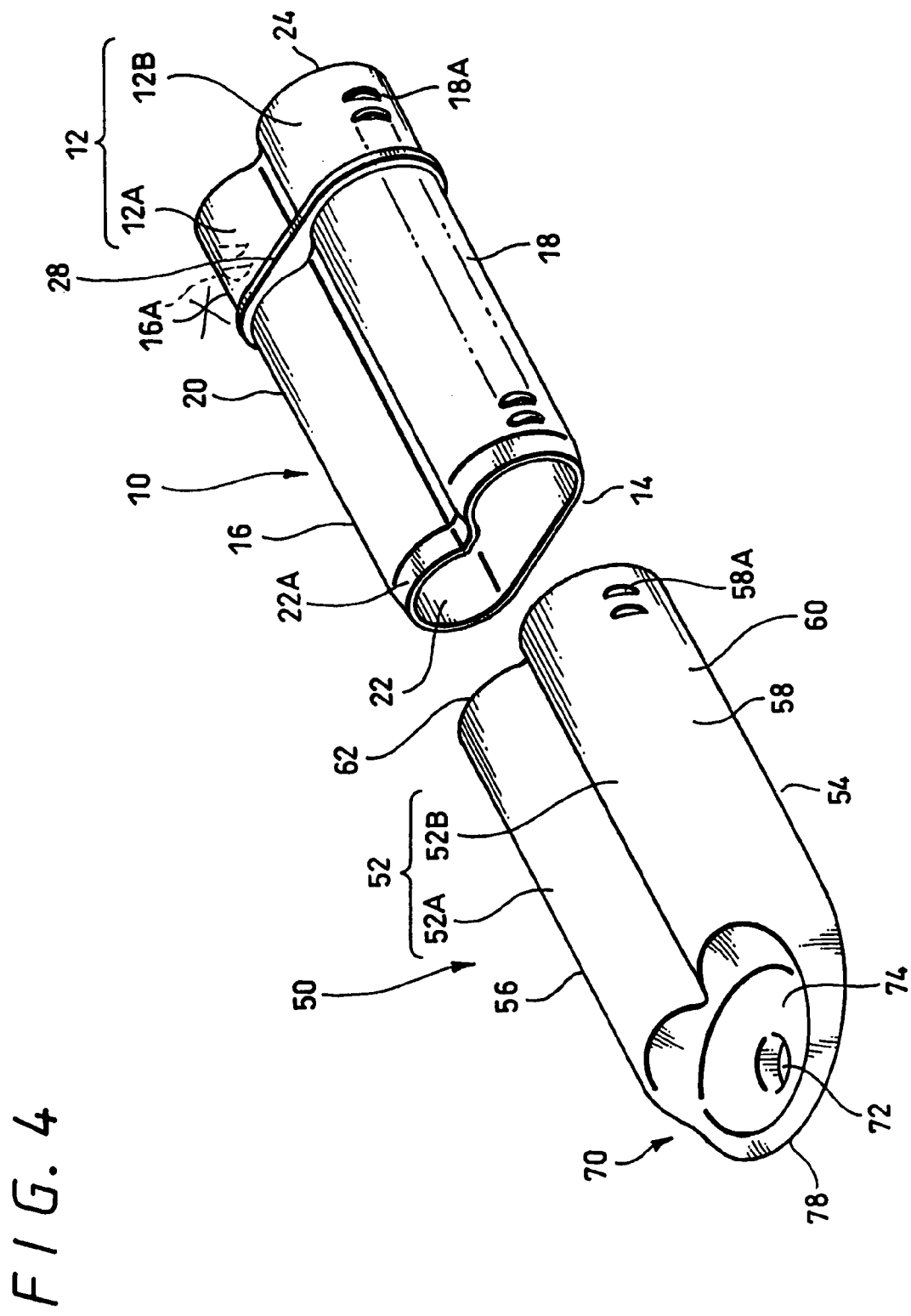
FIG. 4 is a perspective view useful for explaining a battery storage case according to a further embodiment of the present invention.

A battery storage case according to a further embodiment of the present invention will be described below with reference to FIG. 4. As shown in FIG. 4, this embodiment differs from the embodiment shown in FIG. 1 in that a stopper 28 is formed around the body portion 20 of the main body 10. In FIG. 4 other elements and parts except the stopper 28 are identical to those in FIG. 1 and therefore need not be described.

As shown in FIG. 4, the stopper 28 has an outside diameter substantially the same as that of the cross-section of the body portion 60 of the lid portion 50. Thus, when the main body 10 is inserted into the lid portion 50, the opening portion 62 of the lid portion 50 is brought in contact with the stopper 28.

According to the battery storage case of the present invention, there can be obtained advantages that the inventive battery storage case can function as a display case for displaying a battery at a store for sale and that a user can use this battery storage case as a case for storing therein spare batteries for a portable electric product.

Specifically, since the lid portion of the battery storage case includes the through-hole the circumference portion of which is shaped like the concave portion, user can insert a hook, which is used to support the battery storage case for display, et cetera into this through-hole more easily.

Further, since the projection trains of the body portion and the projections or the projection trains of the lid portion are engaged with each other so that the battery storage case can be made flexible, after the batteries have been ejected from the battery storage case, this battery storage case can be contracted, shortened and may become convenient to carry.

Furthermore, since the battery storage case according to the present invention has no sharp projections and has the smooth curved surface on the whole, this battery storage case becomes convenient as a spare battery storage case when it is carried. Moreover, there is then no risk that the battery storage case according to the present invention will damage other goods while it is being kept in a bag or the like together with other goods.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A battery storage case including a main body having a first opening portion at one end of said main body and a bottom surface at an opposing end, and a lid portion having a second opening portion at one end of said lid portion and a head portion at an opposing end, said battery storage case comprising:

a first projection train formed on an outer surface of said main body near said first opening portion;

a second projection train formed on an outer surface of said main body near said bottom surface; and one or more annular projection rows formed around an inner surface of said lid portion, wherein the one or more annular projection rows are adapted to engage one of the first projection train and the second projection train, wherein, a through-hole is formed through the head portion of said lid portion, the main body is capable of storing two batteries when the one or more annular projection rows engage the second projection train and storing one battery when the one or more annular projection rows engage the first projection train, and the outer surface of the main body is elastically inwardly deformed and the lid portion is elastically outwardly deformed when the first projection train and the second projection train contact the one or more annular projection rows during an insertion and an extraction of the main body into or out of the lid portion in a lengthwise direction without requiring a rotation of the main body relatively to the lid portion.

2. The battery storage case according to claim 1, wherein said body portion of said main body and said body portion of said lid portion have cross-sections at least a part of which are shaped like a circular arc.

3. The battery storage case according to claim 2, wherein said main body and said lid portion have circular cross-sections.

4. The battery storage case according to claim 1 or 2, wherein said bottom surface is expanded toward the outside.

5. The battery storage case according to claim 1 or 2, wherein said head portion has a space portion formed between said through-hole and said body portion.

6. The battery storage case according to claim 1 or 2, wherein a projection portion, the outside diameter of which is substantially the same as that of said second opening portion, is formed on an outer surface of said body portion near said bottom surface of said main body.

7. The battery storage case according to claim 1, wherein a circumference portion of at least one opening portion of said through-hole is shaped like a concave portion and a part of the circumference of said through-hole is shaped like a cylindrical portion.

8. The battery storage case according to claim 1, wherein a plurality of projection trains is formed between first and second projection trains.

9. The battery storage case according to claim 1, further comprising a stopper located between the first and second projection trains.

10. The battery storage case according to claim 1, wherein the main body is capable of storing four batteries when the third projection train engages a second projection train and storing two batteries when the third projection train engages the first projection train.

11. The battery storage case according to claim 1, wherein the first projection train comprises more than one projection.

12. The battery storage case according to claim 1, wherein the second projection train comprises more than one projection.

13. The battery storage case according to claim 1, a portion of the main body extending from the opening portion toward the bottom surface has a narrower cross-section than that of any other lengthwise portion of the main body so as to facilitate the insertion of the main body into the lid portion.

14. A battery storage case including a main body having a first opening portion at one end and a bottom surface at the other end, and a lid portion having a second opening portion at one end and a head portion at the other end, said battery storage case comprising:
 a first projection train formed on an outer surface of said main body near said bottom surface; and
 one or more annular projection rows formed around an inner surface of said lid portion near said second opening portion, wherein the one or more annular projection rows are adapted to engage the first projection train, and wherein,
 the main body has a cross-section shaped as a pair of glasses, and
 the outer surface of the main body is elastically inwardly deformed and the lid portion is elastically outwardly deformed when the first projection train contact the one or more annular projection rows during an insertion and an extraction of the main body into or out of the lid portion in a lengthwise direction without requiring a rotation of the main body relatively to the lid portion.

15. The battery storage case according to claim 14, further comprising a through-hole bored through the head portion of said lid portion.

16. The battery storage case according to claim 14, wherein said bottom surface is expanded toward the outside.

17. The battery storage case according to claim 15, wherein said head portion has a space portion formed between said through-hole and a body portion of said lid portion.

18. The battery storage case according to claim 14, wherein a projection portion, the outside diameter of which is substantially the same as that of said second opening portion, is formed on an outer surface of said body portion near said bottom surface of said main body.

19. The battery storage case according to claim 15, wherein a circumference portion of at least one opening portion of said through-hole is shaped like a concave portion and a part of the circumference of said through-hole is shaped like a cylindrical portion.

20. A battery case including a main body having a first opening portion at one end and a bottom surface at the other end, and a lid portion having a second opening portion at one end and a head portion at the other end, said case comprising:
 a first projection train formed over substantially the whole length of said main body in an axial direction; and
 one or more annular projection rows formed on said lid portion near said second opening portion,
 wherein,
 the one or more annular projection rows are adapted to engage the first projection train,
 the main body stores a battery, and
 the outer surface of the main body is elastically inwardly deformed and the lid portion is elastically outwardly deformed when the first projection train contact the one or more annular projection rows during the insertion and the extraction of the main body into or out of the lid portion in a lengthwise direction without requiring a rotation of the main body relatively to the lid portion.

21. The battery storage case according to claim 20, further comprising a through-hole bored through the head portion of said lid portion.

22. The battery storage case according to claim 20, wherein said body portion of said main body and said body portion of said lid portion have cross-sections at least a part of which are shaped like a circular arc.

23. The battery storage case according to claim 20, wherein said main body and said lid portion have circular cross-sections.

24. The battery storage case according to claim 20 further comprising a third projection train formed on said main body near said bottom surface, wherein the second projection train is adapted to engage one of the first projection train and the third projection train.

25. The battery storage case according to claim 20, wherein the main body has a cross-section shaped as a pair of glasses.

* * * * *